United States Patent [19]

Gray

[11] Patent Number: 4,578,006

[45] Date of Patent: Mar. 25, 1986

[54] IMPELLER UNDER FILE MACHINE

[75] Inventor: Stanley J. Gray, Bixby, Okla.

[73] Assignee: Borg-Warner Corporation, Chicago, Ill.

[21] Appl. No.: 544,181

[22] Filed: Oct. 21, 1983

Related U.S. Application Data

[63] Continuation of Ser. No. 39,634, May 16, 1979, abandoned.

[51] Int. Cl.$^4$ .................................................. B23D 5/02
[52] U.S. Cl. ............................... 409/303; 144/144 B; 409/309; 409/314; 409/348
[58] Field of Search ............... 409/119, 120, 289, 303, 409/309, 313, 348, 314; 144/144 B, 152; 51/126, 127

[56] References Cited

U.S. PATENT DOCUMENTS

| 2,782,691 | 2/1957 | Feagans | 409/119 |
| 2,909,966 | 10/1959 | Barens | 409/119 X |
| 3,027,814 | 4/1962 | Schnellmann | 409/289 |
| 3,753,385 | 8/1973 | Zarlengo | 409/313 |

Primary Examiner—Z. R. Bilinsky
Attorney, Agent, or Firm—John W. Harbst

[57] ABSTRACT

Apparatus for underfiling curvelinear vanes of cast centrifugal impellers. Such vanes are cast with generally uniform thickness along their length; it is desirable to have the vanes taper in thickness such that the radially outward portions are thinner than the roots; also this provides a desired curve to each side of the blades.

2 Claims, 2 Drawing Figures

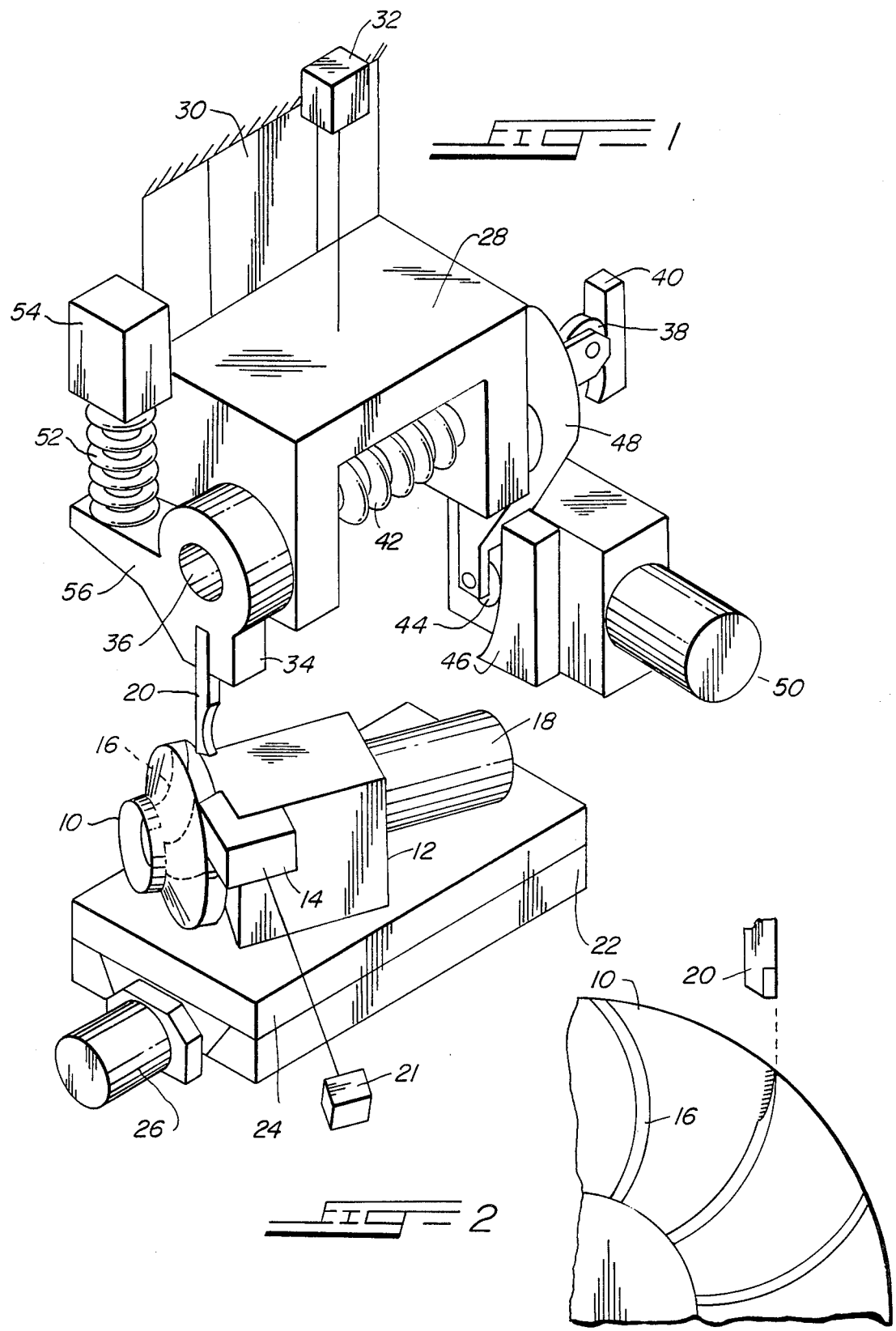

IMPELLER UNDER FILE MACHINE

This application is a continuation of application Ser. No. 039,634 filed May 16, 1979, now abandoned.

BACKGROUND OF THE INVENTION

Underfiling of the vanes of centrifugal impellers has been accomplished manually by using hand-held grinders. This is an expensive use of man power and the results are not uniform.

THE INVENTION

The invention herein described relates to apparatus for underfiling the vanes of centrifugal impellers. The apparatus is adaptable for handling different sizes of such impellers; generally the only manual steps are inserting an impeller in a holding fixture and removing the underfiled impeller therefrom. The apparatus comprises in addition to the holding fixture a cutter moved along a predetermined path of travel determined by means including cam and follower means and means for sequentially indexing the vanes of the impeller to working position.

The apparatus of this invention can be controlled manually or automatically by programmable controls so that each impeller may be underfiled with little or no operator control.

THE DRAWINGS

FIG. 1 is an isometric view of apparatus according to this invention; and

FIG. 2 is a partial sectional view of an impeller showing the cutter means and indicating the material of one of the vanes which is removed by the cutter.

DETAILED DESCRIPTION

In FIG. 1 of the drawing, an impeller 10 to be underfiled is supported on an arbor (not shown) of a holding fixture 12. A vane stop 14 provides firm support to the back side of the impeller vane 16 to substantially prevent movement of the vane 16 during the cutting operation. The vane stop 14 is adjustable as desired. A motor 18 is connected to the arbor and is used to rotate the impeller 10 to properly position it and each vane thereof for engagement by a cutting tool 20. The motor 18 may be associated with electrical means, not shown, to program the motor for the positioning operation. The vane stop 14 is moved from its vane engaging position manually or by a servo motor 21 when the impeller 10 is positioned or repositioned by the motor 18. The holding fixture 12 is supported by a table 22 having a movable supporting top 24, the position of which is adjustable in the direction of its length by a motor 26. Manual means for adjusting the top 24 can be provided in lieu of the motor 26.

The cutting tool 20 is carbide tipped or of a hard grade of cutting steel and is supported on a ram assembly 28 which reciprocates along a spatially fixed axis in a generally vertical path determined by a guide 30 powered by means 32. A cutting tool holder 34 is connected to an axially movable shaft 36, the axial movement of the shaft 36 being controlled by a roller cam follower 38 supported on the shaft 36 and engaging a cam 40. Engagement of the roller cam follower 38 and the cam 40 is insured by a coil spring 42 surrounding the shaft 36 and urging the shaft and thus the cam roller 38 toward the cam 40.

Limited rotary motion is imparted to the shaft 36 by a roller cam follower 44 engaging a cam 46, the follower 44 being connected to the shaft 36 by a roller 48 fixed to the shaft. The position of the cam 46 is adjustable by means of a motor 50. Spring means 52 between a fixed block 54 and an ear 56 of the holder 34 insures cam follower 44—cam 46 contact.

Attention is invited to FIG. 2 of the drawings which shows a typical section through an impeller 10 and the relationship of an impeller vane 16 and the cutter 20. The material to be removed by the cutter is shown in a shaded area as indicated; as noted, the discharge end of each vane 16 is reduced in thickness to a thickness desired and not obtainable when the impeller and its vanes are cast.

In operation, an impeller 10 is mounted on an arbor of a holding fixture 12 with a vane 16 properly located with respect to the cutter 20 and the vane stop 14 is positioned to firmly support the backside of the vane 16. The ram 28 is reciprocated along a fixed axis provided by the guide 30, thus moving the cutter 20 vertically. However, a curvilinear motion is imparted to the cutter 20 by means of the cams 40 and 46 and the respective cam followers 38 and 44. The motors 26 and 50, respectively, move the support 24 of the table 22 and the cam 46 progressively toward and across the vane 16 to insure the removal of the proper amount of material from the vane 16 by the cutter 20 at each stroke.

When one vane 16 is finished the stop 14 is withdrawn by the motor 20, the indexing motor 18 is energized to rotate the impeller 10 to position another vane 16 for cutting and the sequence of steps is repeated. This sequence is repeated until all vanes are underfiled.

I claim:

1. Apparatus for underfiling curvilinear vanes on centrifugal pump impellers which are cast with vanes of substantially uniform thickness and which are filed to vanes which taper from a relatively thin edge to a thicker and unchanged central thickness comprising:
   a non rotating cutting tool movable along a predetermined path of travel;
   indexing means for supporting and rotating an impeller about its axis to sequentially position each impeller vane so that its edge is facing upwardly beneath the cutting tool;
   actuating means to move said cutting tool vertically downward toward and into engagement with a vane for an initial portion of its predetermined path of travel and then in a curvilinear direction for the remainder of its movement along the predetermined path of travel so that it shapes one surface only of the vane therebeneath to provide the taper to said vane; said actuating means comprising first operative means for imparting generally vertical movement to said cutting tool along a spatially fixed generally vertical axis, second operative means including a first cam and follower for controlling the movement of said cutting tool generally downwardly and then in a curvilinear direction, third operative means including a second cam and follower for moving said cutting tool laterally across said vane to insure that the entire vane is underfiled, and means to resiliently urge each cam into engagement with its respective follower.

2. Apparatus as recited in claim 1, further comprising means for supporting the back surface of each vane during the cutting of said one surface.

* * * * *